(12) United States Patent
Kanazawa et al.

(10) Patent No.: US 8,346,448 B2
(45) Date of Patent: Jan. 1, 2013

(54) OUTPUT TORQUE CONTROL DEVICE

(75) Inventors: Satoshi Kanazawa, Saitama (JP);
Takeshi Kurata, Saitama (JP)

(73) Assignee: Honda Motor Co., Ltd., Tokyo (JP)

(*) Notice: Subject to any disclaimer, the term of this patent is extended or adjusted under 35 U.S.C. 154(b) by 0 days.

(21) Appl. No.: 13/130,537

(22) PCT Filed: Dec. 7, 2010

(86) PCT No.: PCT/JP2010/071900
§ 371 (c)(1),
(2), (4) Date: May 20, 2011

(87) PCT Pub. No.: WO2011/080993
PCT Pub. Date: Jul. 7, 2011

(65) Prior Publication Data
US 2012/0109475 A1  May 3, 2012

(30) Foreign Application Priority Data

Feb. 25, 2010 (JP) ................................. 2010-040426

(51) Int. Cl.
*G06F 7/00* (2006.01)
(52) U.S. Cl. ........... 701/54; 701/84; 180/69.6; 180/248; 477/37
(58) Field of Classification Search ............... 701/54, 701/48, 84; 180/69.6, 248; 477/37, 111
See application file for complete search history.

(56) References Cited

U.S. PATENT DOCUMENTS

| | | | |
|---|---|---|---|
| 5,791,427 A * | 8/1998 | Yamaguchi | 180/65.235 |
| 5,951,614 A * | 9/1999 | Tabata et al. | 701/54 |
| 6,254,508 B1 * | 7/2001 | Kojima et al. | 477/109 |
| 6,379,280 B1 | 4/2002 | Ogawa et al. | |
| 8,267,836 B2 * | 9/2012 | Suzuki | 477/77 |
| 2002/0098944 A1 | 7/2002 | Iriyama | |
| 2005/0170931 A1 * | 8/2005 | Maekawa et al. | 477/111 |
| 2008/0249690 A1 * | 10/2008 | Matsumoto et al. | 701/48 |

FOREIGN PATENT DOCUMENTS

| | | |
|---|---|---|
| JP | 2001-073839 A | 3/2001 |
| JP | 2002-195087 A | 7/2002 |
| JP | 2008-280926 A | 11/2008 |

* cited by examiner

*Primary Examiner* — Behrang Badii
*Assistant Examiner* — Shardul Patel
(74) *Attorney, Agent, or Firm* — Arent Fox LLP

(57) ABSTRACT

Detection-time torque of a drive source is determined when a value that varies in accordance with depression of an accelerator pedal has exceeded a predetermined value, first torque is determined on the vehicle speed and the transmission gear ratio, second torque is determined on the detection-time torque and the first torque, third torque is determined on the amount of depression of the accelerator pedal and the second torque, and fourth torque is determined on the depression of the accelerator pedal, and the output torque is limited to the third torque as long as the third torque is less than the fourth torque. The third torque is determined such that in the case where the detection-time torque is greater than the first torque, an increase of the third torque is suppressed further than where the detection-time torque is not greater than the first torque.

4 Claims, 6 Drawing Sheets

OUTPUT TORQUE CONTROL DEVICE

CROSS-REFERENCE TO RELATED APPLICATION

This application is a National Stage entry of International Application No. PCT/JP2010/071900, filed Dec. 7, 2010, which claims priority to Japanese Patent Application No. 2010-040426, filed Feb. 25, 2010, the entire specification claims and drawings of which are incorporated herewith by reference.

TECHNICAL FIELD

The present invention relates to an output torque control device which controls torque that is output from a drive source of a vehicle at startup of the vehicle.

BACKGROUND ART

Devices for controlling output torque of a drive source of a vehicle at startup thereof have been proposed, which include the control device disclosed in Patent Document 1 below. According to this control device, target output torque is set, and the output torque of the drive source is controlled to approach the target torque, so as to ensure smooth acceleration of the vehicle in accordance with depression of the accelerator pedal, without depending on the operating condition of the drive source before acceleration and without impairing the acceleration response.

PRIOR ART DOCUMENTS

Patent Documents
  Patent Document 1: Japanese Patent Application Laid-Open No. 2008-280926

DISCLOSURE OF THE INVENTION

Problem to be Solved by the Invention
  In the case of controlling the actual output torque to approach the target torque, however, the control process becomes more complicated and takes more time than in the case of determining the output torque in accordance with the conditions of the drive source, a transmission, and the like.
  It is thus an object of the present invention to provide an output torque control device which ensures smooth acceleration by determining output torque of a drive source under acceleration on the basis of the output torque when an accelerator pedal was depressed and the amount of depression of the accelerator pedal.

Means for Solving the Problem

The present invention provides an output torque control device for controlling output torque of a drive source of a vehicle, the device including: a timing detecting unit configured to detect a timing at which a value that varies in accordance with depression of an accelerator pedal of the vehicle has exceeded a predetermined value; a first torque determining unit configured to determine a value of the output torque of the drive source on the basis of a speed of the vehicle and a transmission gear ratio of a transmission that changes speed of an output of the drive source; a second torque determining unit configured to determine a value of the output torque of the drive source on the basis of both the value of the output torque of the drive source at the time when the timing detecting unit detected the timing (hereinafter, this torque is referred to as the "detection-time torque") and the value of the output torque of the drive source determined by the first torque determining unit (hereinafter, this torque is referred to as the "first torque"); a third torque determining unit configured to determine a value of the output torque of the drive source on the basis of both the amount of depression of the accelerator pedal and the value of the output torque of the drive source determined by the second torque determining unit (hereinafter, this torque is referred to as the "second torque"); a fourth torque determining unit configured to determine a value of the output torque of the drive source on the basis of the amount of depression of the accelerator pedal; and an output torque limiting unit configured to limit the output torque of the drive source to the value of the output torque of the drive source determined by the third torque determining unit (hereinafter, this torque is referred to as the "third torque"), from the time when the timing detecting unit detected the timing, as long as the value of the third torque is less than the value of the output torque of the drive source determined by the fourth torque determining unit (hereinafter, this torque is referred to as the "fourth torque"); wherein the second torque determining unit determines the value of the second torque to be at least the value of the first torque in the case where the value of the detection-time torque is less than the value of the first torque, and determines the value of the second torque to be the value of the detection-time torque in the case where the value of the detection-time torque is not less than the value of the first torque, and wherein the third torque determining unit determines the value of the output torque of the drive source in such a manner that in the case where the value of the detection-time torque is greater than the value of the first torque, an increase of the value of the third torque is suppressed further than in the case where the value of the detection-time torque is not greater than the value of the first torque.

According to the present invention, in the case where the value of the detection-time torque is less than the value of the first torque, at least the value of the first torque is set to be the value of the second torque, and in the case where the value of the detection-time torque is not less than the value of the first torque, the value of the detection-time torque is set to be the value of the second torque. That is, in the case where the value of the output torque of the drive source under acceleration in accordance with depression of the accelerator pedal is less than the value of the first torque that is determined on the basis of the speed and the transmission gear ratio at that time, the value of the output torque of the drive source is increased to a value that is sufficient for acceleration.
  Further, from the time when the timing detecting unit detected the timing, as long as the value of the third torque is less than the value of the fourth torque, the output torque limiting unit limits the output torque of the drive source to the value of the third torque. Then, the third torque determining unit determines the value of the output torque of the drive source in such a manner that in the case where the value of the detection-time torque is greater than the value of the first torque, the rise of the value of the third torque is suppressed further than in the case where the value of the detection-time torque is not greater than the value of the first torque.
  That is, in the case where the value of the output torque of the drive source under acceleration in accordance with depression of the accelerator pedal is not less than the value of the first torque that is determined on the basis of the vehicle speed and the transmission gear ratio at the time when the timing detecting unit detected the timing, an abrupt increase of the output torque of the drive source is suppressed.

As describe above, the value of the output torque of the drive source under acceleration is determined on the basis of the output torque at the time when the accelerator pedal was depressed and the amount of depression of the accelerator pedal. This realizes smooth acceleration of the vehicle.

In the present invention, the timing detecting unit preferably detects the timing at which a variation in the amount of depression of the accelerator pedal has exceeded a first predetermined value. This ensures that an acceleration request made to the vehicle is properly detected when the variation in the amount of depression of the accelerator pedal has exceeded the first predetermined value.

In the present invention, the timing detecting unit preferably detects the timing at which a variation of the fourth torque has exceeded a second predetermined value. In this case, it is possible to properly detect an acceleration request made to the vehicle when the variation of the output torque of the drive source that is determined on the basis of the amount of depression of the accelerator pedal has exceeded the second predetermined value.

In the present invention, the third torque determining unit preferably determines the output torque on the further basis of the speed of the vehicle and the transmission gear ratio. In this case, the output torque of the drive source can be corrected appropriately using the vehicle speed and the transmission gear ratio as additional information, whereby smooth acceleration is ensured.

MODE FOR CARRYING OUT THE INVENTION

Figure 1:
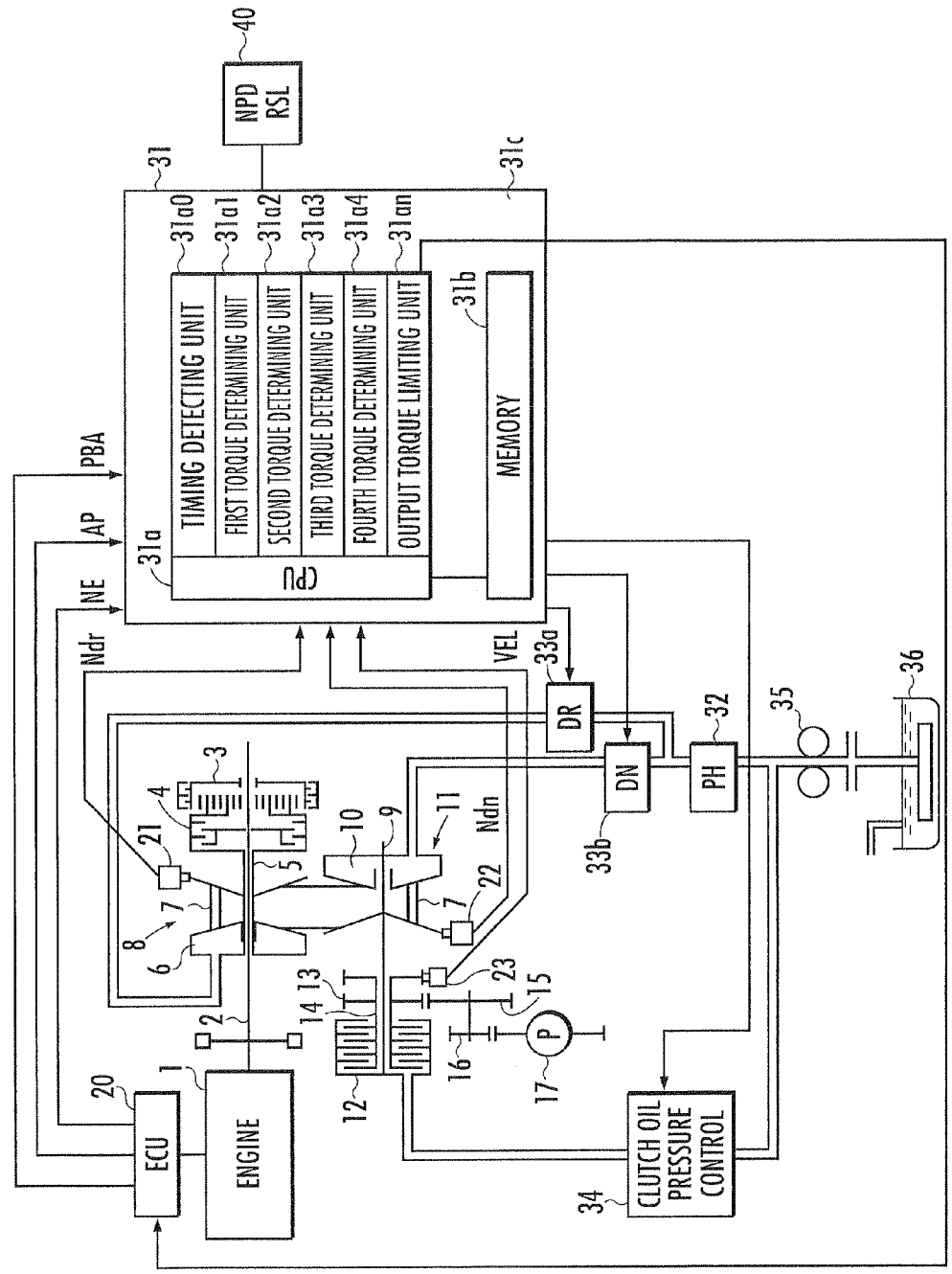
FIG. 1 schematically shows a configuration of an output torque control device according to an embodiment of the present invention.

FIG. 1 shows a configuration of an output torque control device according to an embodiment of the present invention. In the present embodiment, the output torque control device is for a vehicle having an engine (internal combustion engine) as a drive source, and a transmission used in the vehicle is a continuously variable transmission (CVT).

In FIG. 1, an engine 1 of the vehicle is supported by an engine mount which is configured to absorb shock by means of an elastic body. A driving shaft 2 for transmitting an output from the engine 1 is connected to an input shaft 5 of a transmission via a forward/reverse changeover mechanism 3 and a forwarding clutch 4. The input shaft 5 is provided with a variable pulley (hereinafter, referred to as the "driving pulley") 8, which has its V-shaped groove width changeable by a variable hydraulic cylinder 6, leading to a change in winding diameter of a transmission belt 7.

The transmission belt 7 is looped over the driving pulley 8 of the transmission and a variable pulley (hereinafter, referred to as the "driven pulley") 11 provided on a driven shaft 9 of the transmission. The driven pulley 11 also has its V-shaped groove width changeable by a variable hydraulic cylinder 10, resulting in a change in winding diameter of the transmission belt 7.

The components 3 to 11 described above constitute the continuously variable transmission. The driven shaft 9 is connected to an output shaft 14 via a starting clutch 12 having a clutch piston (not shown). The output shaft 14 is provided with an output gear 13. The output gear 13 is connected to a differential gear 17 via intermediate gears 15 and 16.

At gear engagement, the turning force transmitted from the engine 1 to the driving shaft 2 is transmitted through the forwarding clutch 4 to the driving pulley 8, and then transmitted through the transmission belt 7 to the driven pulley 11. Then, in accordance with depression of the accelerator pedal, the turning force of the driven pulley 11 is transmitted through the starting clutch 12 to the output shaft 14, and the turning force of the output shaft 14 is transmitted through the output gear 13, the intermediate gears 15 and 16, and the differential gear 17, to right and left driving wheels (not shown).

An electronic control unit (ECU) 20 controls rotation of the engine 1. The ECU 20 is connected with a transmission control device 31 which controls the oil pressures of the hydraulic cylinders 6 and 10, and the like.

The transmission control device 31 is composed of: a CPU 31a which executes various computations; a storage device (memory) 31b including a ROM and a RAM for storing various computation programs executed by the CPU 31a, various kinds of tables as will be described later, and computation results; and an input/output interface 31c which inputs various kinds of electrical signals and also externally outputs driving signals (electrical signals) on the basis of the computation results.

In the present embodiment, the transmission control device 31 is configured to serve as an output torque control device 31 which controls output torque of the engine 1 as well. Accordingly, the CPU 31a of the transmission control device 31 executes output torque control processing as will be described later (including: processing by a timing detecting unit 31a0, processing by a first torque determining unit 31a1, processing by a second torque determining unit 31a2, processing by a third torque determining unit 31a3, processing by a fourth torque determining unit 31a4, and processing by an output torque limiting unit 31an).

The transmission control device 31 is supplied, from the ECU 20, with values of engine speed NE, throttle valve opening AP which changes in accordance with depression of the accelerator pedal (not shown), and intake pipe absolute pressure PBA.

The transmission control device 31 is also supplied with an output from an input shaft rotational speed sensor 21 which is arranged in the vicinity of the driving pulley 8 for detecting the rotational speed Ndr of the input shaft 5, an output from a driven shaft rotational speed sensor 22 which is arranged in the vicinity of the driven pulley 11 for detecting the rotational speed Ndn of the driven shaft 9, and an output from an output shaft rotational speed sensor 23 which is arranged in the vicinity of the output shaft 14 for detecting the vehicle speed VEL.

The transmission control device 31 is further connected with a selector (or, a reduction gear ratio selecting device) 40 of the automatic transmission. The condition of a select lever (not shown) of the selector 40 is detected and supplied to the transmission control device 31. In the present embodiment, the selector 40 is capable of selecting any of six ranges of: neutral (N), parking (P), drive (D), reverse (R), second (S), and low (L).

The transmission control device 31 outputs signals to control oil pressure generating devices 33a and 33b to cause them to generate a driving pulley oil pressure (DR) and a driven pulley oil pressure (DN), respectively, and to cause a starting clutch oil pressure control device 34 to operate a linear solenoid valve, and outputs a signal to the ECU 20 to cause it to control the output torque of the engine 1.

A PH (High Pressure) generating device 32 has its oil intake side connected to an oil tank 36 via a hydraulic pump 35. The PH generating device 32 has its oil supply side connected to oil intake sides of the control oil pressure generating devices 33a and 33b, so that the oil pressure from the PH generating device 32 is supplied to the control oil pressure generating devices 33a and 33b.

The control oil pressure generating device 33a has its oil supply side connected to the hydraulic cylinder 6, and the control oil pressure generating device 33b has its oil supply side connected to the oil intake side of the hydraulic cylinder 10. The oil pressures regulated in accordance with control signals from the transmission control device 31 are supplied to the respective hydraulic cylinders 6 and 10.

The V-shaped groove widths of the driving pulley 8 and the driven pulley 11 are determined in accordance with the oil pressures supplied from the control oil pressure generating devices 33a and 33b to the hydraulic cylinders 6 and 10, respectively, so that a transmission gear ratio TR of the continuously variable transmission is determined. The transmission gear ratio TR is represented as a ratio between output torque of the driven pulley 11 and input torque of the driving pulley 8. That is, the transmission gear ratio TR is obtained by dividing the rotational speed Ndr of the input shaft 5 by the rotational speed Ndn of the driven shaft 9.

Hereinafter, output torque control processing executed by the CPU 31a of the transmission control device 31 serving as the output torque control device will be described. In the present embodiment, the CPU 31a operates as the timing detecting unit 31a0, the first torque determining unit 31a1, the second torque determining unit 31a2, the third torque determining unit 31a3, the fourth torque determining unit 31a4, and the output torque limiting unit 31an of the present invention.

Figure 2:
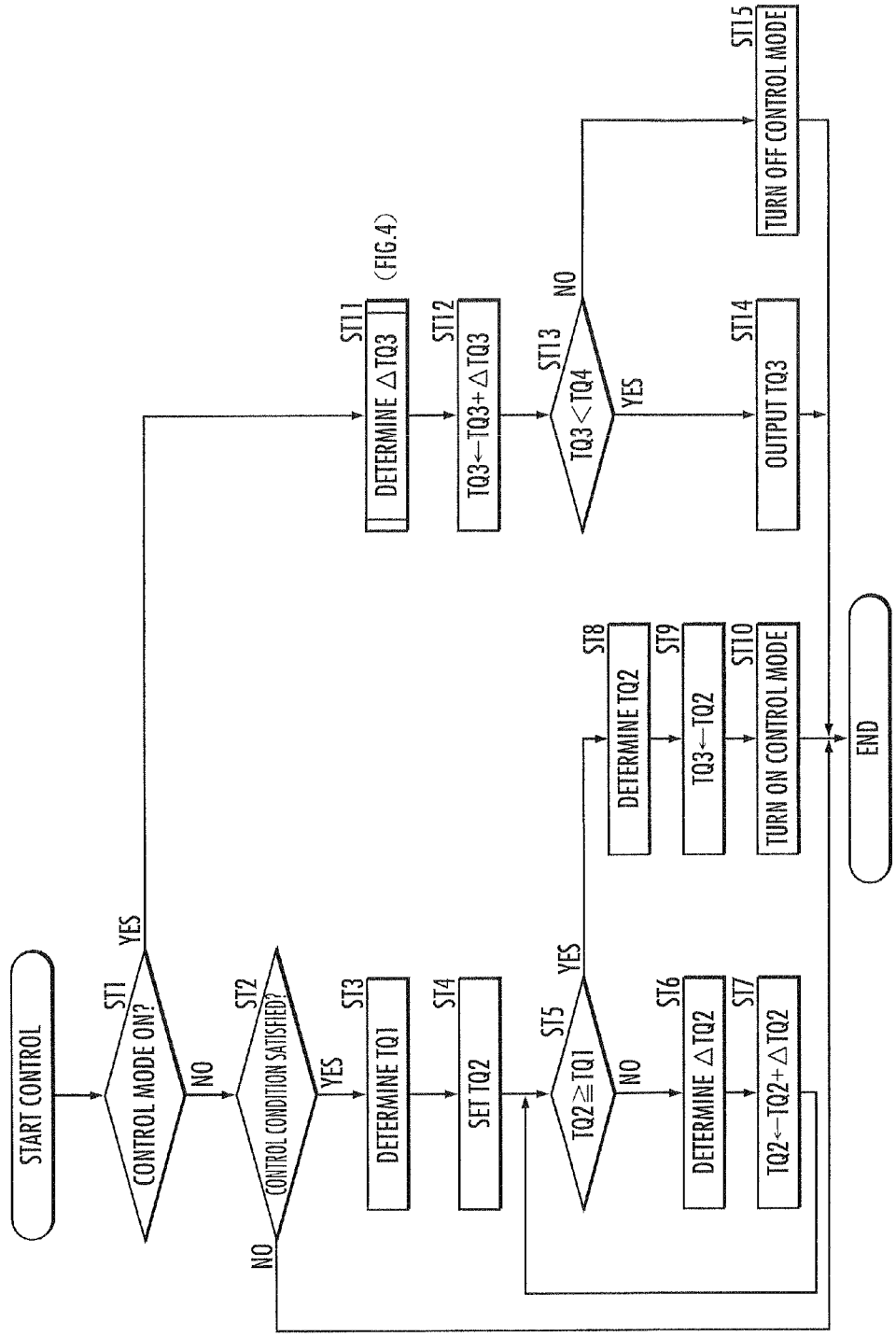
FIG. 2 is a flowchart illustrating procedure of output torque control processing which is executed by a CPU of a transmission control device shown in FIG. 1.

FIG. 2 is a flowchart illustrating procedure of the output torque control processing executed by the CPU 31a. The control processing program shown by this flowchart is called and executed at predetermined time intervals (of 10 msec, for example).

In this control processing, firstly, in step ST1, the transmission control device 31 determines whether or not a control mode is on or off. If the control mode is off, the process proceeds to step ST2.

In step ST2, the transmission control device 31 determines whether or not a control condition has been satisfied. Specifically, the transmission control device 31 determines whether or not the vehicle speed VEL has exceeded a predetermined value V1, whether or not the throttle valve opening AP has exceeded a predetermined value V2, and whether or not the variation of the throttle valve opening AP within a control period has exceeded a predetermined value V3, and determines that the control condition is satisfied only in the case where the determination results are all YES. This step ST2 corresponds to the timing detecting unit of the present invention.

It is desirable to perform the present control processing on the condition that the vehicle is traveling at a speed VEL enabling sufficient acceleration. Thus, the predetermined value V1 is set to a value that allows a determination to be made that the vehicle speed VEL is appropriate for the present control processing.

If the value of the throttle valve opening AP is small, sufficient output torque will not be able to be obtained from the engine. Thus, the predetermined value V2 is set to a value that allows a determination to be made that the throttle valve opening AP is sufficient for controlling the output torque.

If the variation of the throttle valve opening AP within a control period is small, it is unlikely that the accelerator pedal has been depressed requiring acceleration. Thus, the predetermined value V3 is set to a value that allows a determination to be made that acceleration has been requested.

If the determination result in step ST2 is NO, the present control processing is terminated, while if the determination result is YES, the process proceeds to step ST3.

Figure 3:
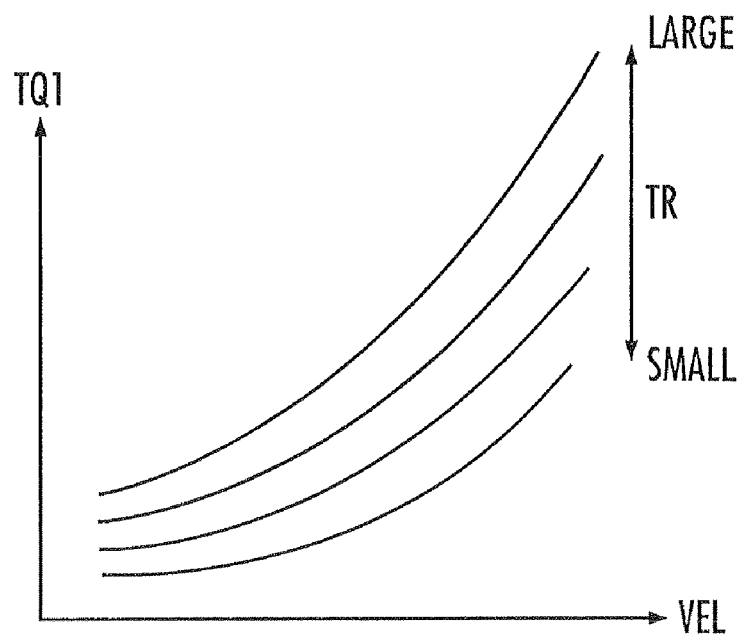
FIG. 3 shows, by way of example, (a) vehicle speed VEL—first torque TQ1 characteristics and (b) throttle valve opening AP—variation ΔTQ2 characteristics according to an embodiment of the present invention.
Figure 3:
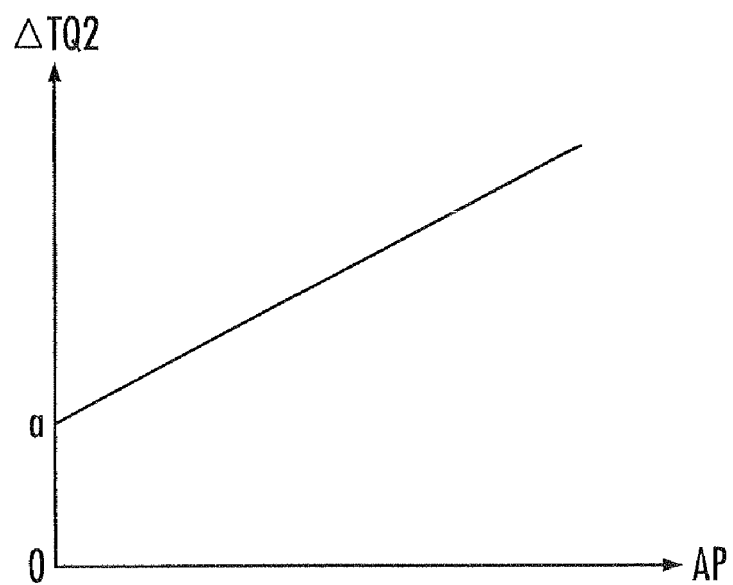

In step ST3, the transmission control device 31 determines first torque TQ1. Specifically, a table having the characteristics as shown in FIG. 3(a) by way of example is prepared in advance, and the first torque TQ1 is retrieved on the basis of the vehicle speed VEL and the transmission gear ratio TR. The first torque TQ1 is torque output from the engine while the vehicle is traveling at a constant speed. That is, during deceleration of the vehicle, torque smaller than the first torque TQ1 is output from the engine, while during acceleration of the vehicle, torque greater than the first torque TQ1 is output from the engine.

In FIG. 3(a), the horizontal axis represents the vehicle speed VEL (unit: km/h; range: 0 to 200, for example), and the vertical axis represents the first torque TQ1 (unit: Nm; range: 0 to 250, for example).

The first torque TQ1 has the characteristic that it increases with increasing vehicle speed. This characteristic also varies in accordance with the transmission gear ratio TR of the continuously variable transmission, so that a plurality of characteristic curves for different transmission gear ratios TR are prepared, and one of the characteristic curves that corresponds to the concerned transmission gear ratio TR is used to determine the first torque TQ1. The output torque of the transmission increases with increasing transmission gear ratio TR, so that the characteristic curve rises. The output torque of the transmission decreases with decreasing transmission gear ratio TR, so that the characteristic curve falls.

While FIG. 3(a) shows four types of transmission gear ratios TR by way of example, an arbitrary number of characteristic curves that enables appropriate setting of the first torque TQ1 may be prepared.

As described above, the first torque TQ1 is determined in accordance with the vehicle speed VEL and the transmission gear ratio TR at the start of the control mode, by using the characteristic table as shown in FIG. 3(a).

It is noted that the process in step ST3 described above corresponds to the first torque determining unit 31a1 of the present invention.

The process then proceeds to step ST4, where the transmission control device 31 sets (provisionally determines) second torque TQ2. Specifically, the value of the torque (detection-time torque TQ0) being output from the engine at the present time point is set as the second torque TQ2. The second torque TQ2 is determined in steps ST5 to ST8, which will be described below.

The process then proceeds to step ST5, where the transmission control device 31 determines whether or not the value of the second torque TQ2 is at least the value of the first torque TQ1, and if not, the process proceeds to step ST6.

In step ST6, the transmission control device 31 determines a variation ΔTQ2. Specifically, a table having the characteristics as shown in FIG. 3(b) by way of example is prepared in advance, and the variation ΔTQ2 is retrieved on the basis of the throttle valve opening AP at the present time point.

In FIG. 3(b), the horizontal axis represents the throttle valve opening AP (unit: %; range: 0 to 100, for example), and the vertical axis represents the variation ΔTQ2 (unit: Nm/control period; range: 0 to 5, for example).

The greater the throttle valve opening AP, the greater the engine output torque. Thus, the variation ΔTQ2 has the characteristic that it increases with increasing throttle valve opening AP.

The process then proceeds to step ST7, where the transmission control device 31 newly calculates a value of the second torque TQ2, by adding the value of the variation ΔTQ2, determined in step ST6, to the value of the second torque TQ2 at the present time point.

Thereafter, the process returns to step ST5, where it is determined whether or not the value of the second torque TQ2 calculated in step ST7 is at least the value of the first torque TQ1. As long as the determination result is NO, the processes in steps ST6 and ST7 are repeated before making a determination in step ST5 again.

If the determination result in step ST5 is YES, the process proceeds to step ST8, where the transmission control device 31 determines the value of the second torque TQ2 that has become not less than the value of the first torque TQ1 to be a final value of the second torque TQ2.

The process then proceeds to step ST9, where the transmission control device 31 determines the value of the second torque TQ2 to be a value of third torque TQ3, which will be described later. Then, the process proceeds to step ST10, where the transmission control device 31 turns on the control mode, thereby terminating the present control processing.

In summary, at the first-time determination in step ST5, the transmission control device 31 determines whether or not the output torque of the vehicle at the start of the present control processing (i.e. the value of the detection-time torque TQ0 set as the second torque TQ2) is sufficient for acceleration (i.e. whether or not it is not less than the value of the first torque TQ1). In the case where the detection-time torque TQ0 is sufficient for acceleration, in step ST8, the value of the detection-time torque TQ0 is set as the value of the second torque TQ2. On the other hand, in the case where the detection-time torque TQ0 is insufficient for acceleration, the transmission control device 31 repeats the processes in steps ST6 and ST7 until the determination result in step ST5 becomes YES, so as to increase the second torque TQ2 until it reaches the level sufficient for acceleration.

More specifically, in the processes in steps ST4 to ST8, the second torque TQ2 is determined on the basis of the values of the detection-time torque TQ0 and the first torque TQ1. In the case where the value of the detection-time torque TQ0 is not less than the value of the first torque TQ1, the value of the second torque TQ2 is set to the value of the detection-time torque TQ0, while in the case where the value of the detection-time torque TQ0 is less than the value of the first torque TQ1, the value of the second torque TQ2 is set to at least the value of the first torque TQ1.

Accordingly, the processes in steps ST4 to ST8 correspond to the second torque determining unit 31a2 of the present invention.

After the second torque TQ2 is determined in step ST8, in step ST9, the determined value of the second torque TQ2 is set to be the value of the third torque TQ3, as described above. The third torque TQ3 refers to the engine output torque that is determined on the basis of the amount of depression of the accelerator pedal and the value of the second torque TQ2. That is, the third torque TQ3 is set to the value of the second torque TQ2 in step ST9, and is determined on the basis of the value of the second torque TQ2 and the amount of depression of the accelerator pedal in the processes in steps ST11 and ST12, which will be described below.

Now, description will be made about the operations in the case where it is determined in step ST1 that the control mode is on. In this case, the process proceeds to step ST11, where the transmission control device 31 determines a variation ΔTQ3, which will be described later. This step will be described later in detail.

The process then proceeds to step ST12, where the transmission control device 31 calculates a new value of the third torque TQ3 by adding the variation ΔTQ3, determined in step ST11, to the third torque TQ3 at the present time point.

The process then proceeds to step ST13, where the transmission control device 31 determines whether or not the value of the third torque TQ3 calculated in step ST12 is less than a value of fourth torque TQ4, which is determined on the basis of the amount of depression of the accelerator pedal by the fourth torque determining unit 31a4. If the determination result is YES, the process proceeds to step ST14, where the transmission control device 31 sets the third torque TQ3 as the engine output torque, and terminates the present control processing. If the determination result is NO, the process proceeds to step ST15, where the transmission control device 31 turns off the control mode before terminating the present control processing.

It is noted that the processes in steps ST13 and ST14 described above correspond to the torque limiting unit 31an.

According to the processes in steps ST11 to ST15, the third torque TQ3 is set as the engine output torque as long as the value of the third torque TQ3 is less than the value of the fourth torque TQ4. This prevents the torque from increasing suddenly, thereby ensuring smooth acceleration.

Description will now be made, with reference to FIG. 4, about the process of determining the variation ΔTQ3 in step ST11 described above.

Figure 4:
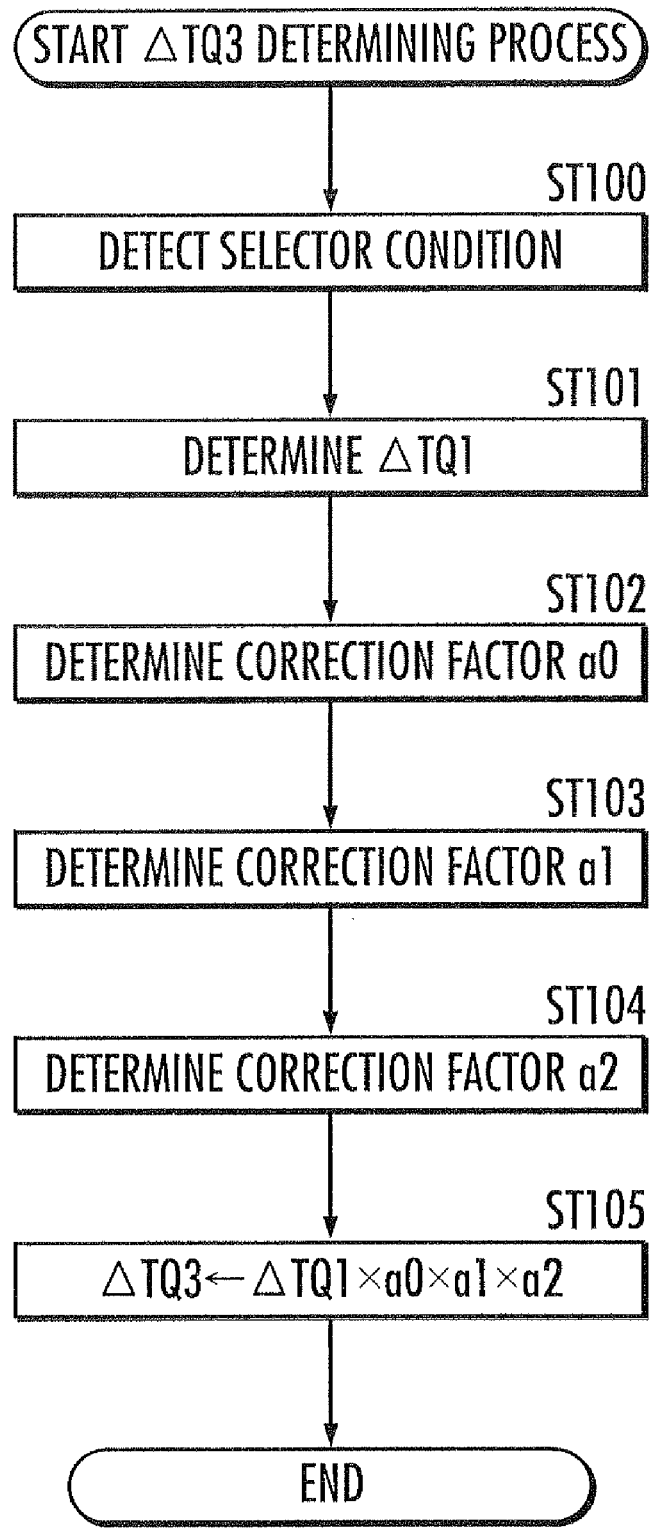
FIG. 4 is a flowchart illustrating procedure of a process of determining the variation ΔTQ3 in step ST11 in FIG. 2.

In the first step ST100 in FIG. 4, it is determined whether or not the select lever of the selector 40 has been set to one of drive (D), reverse (R), second (S), and low (L), or a manual transmission mode has been selected, or none of the above applies (failed state).

The process then proceeds to step ST101, where the transmission control device 31 determines a variation ΔTQ1 of the first torque TQ1. A table having the characteristics as shown in FIG. 5(a) by way of example is prepared in advance, and the variation ΔTQ1 is determined on the basis of the transmission gear ratio TR and the time elapsed from the start of the present control period.

This characteristic varies in accordance with the transmission gear ratio TR, so that a plurality of characteristic curves are prepared respectively for different transmission gear ratios TR, and the transmission control device 31 selects the characteristic curve corresponding to the transmission gear ratio TR at the present time point. As the transmission gear ratio TR increases, the output torque of the transmission decreases. Thus, correction is made to increase the torque.

Accordingly, the characteristic curve rises as the transmission gear ratio TR increases, while it falls as the transmission gear ratio decreases.

Figure 5:
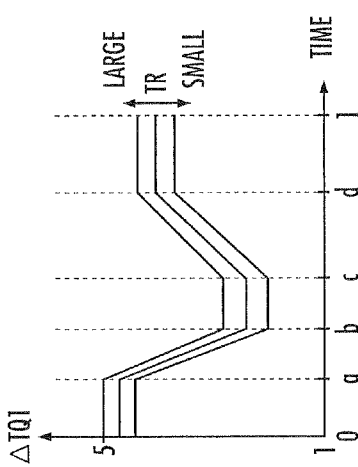
FIG. 5 shows, by way of example, (a) time—variation ΔTQ1 characteristics, (b) vehicle speed VEL—correction factor a0 characteristics, (c) clutch slip ratio ESC—correction factor a1 characteristics, and (d) (second torque TQ2—first torque TQ1)—correction factor a2 characteristics according to an embodiment of the present invention.
Figure 5:
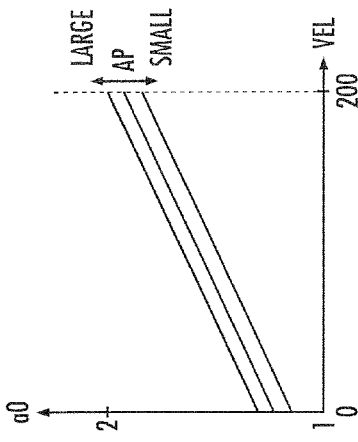
Figure 5:
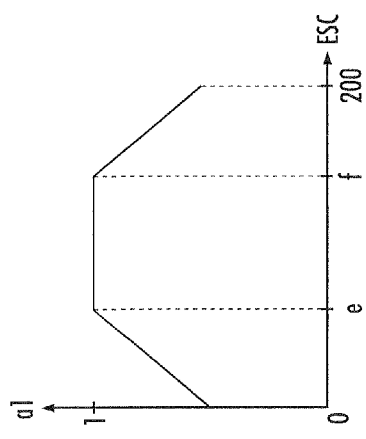
Figure 5:
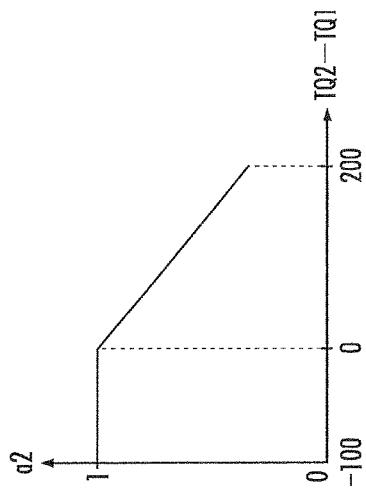

While three types of transmission gear ratios TR are presented in FIG. 5(a) by way of example, an arbitrary number of characteristic curves that enables appropriate determination of the variation $\Delta TQ1$ may be prepared.

In FIG. 5(a), the horizontal axis represents time (unit: second; range: 0 to 1, for example), and the vertical axis represents the variation $\Delta TQ1$ (unit: Nm/control period; range: 0 to 5, for example). The time on the horizontal axis indicates the time elapsed from the start of the present control processing. In the present embodiment, the control processing is configured to be finished within a period of one second, although the period is not limited to "one second" but may be set as appropriate.

In order to ensure that the engine mount also having the shock absorbing function with the elastic body is able to absorb shock sufficiently, the characteristic curves in FIG. 5(a) are set in the following manner. Before the engine mount attains maximum elastic energy, generation of torque too large to be shock-absorbed is suppressed. Immediately before the engine mount attains the maximum elastic energy, an abrupt increase of the torque is prevented, thereby suppressing shock that cannot be absorbed. Once the engine mount has its maximum elastic energy, large torque is generated, because the force produced by the elastic energy can absorb the shock resulting from the large torque.

More specifically, during a period from time 0 to time a in FIG. 5(a), in which the engine mount has not yet obtained the maximum elastic energy, the variation $\Delta TQ1$ is set larger than that in other time periods. During a period from time b to time c, i.e. immediately before the engine mount obtains the maximum elastic energy, the variation $\Delta TQ1$ is set small. This can avoid the undesirable event that shock is generated as the engine mount cannot absorb the shock sufficiently. During a period from time d to time 1, i.e. after the engine mount has attained the maximum elastic energy, the variation $\Delta TQ1$ is set larger than that in the period from time b to time c.

Further, during a period from time a to time b, or, a transition to time b, the variation $\Delta TQ1$ is decreased. During a period from time c to time d, or, a transition to time d, the variation $\Delta TQ1$ is increased.

As described above, the characteristic curves shown in FIG. 5(a) are used to ensure smooth acceleration, in the case where the vehicle is traveling at a constant speed (i.e. in the case where the value of the detection-time torque TQ0 is equal to the value of the first torque TQ1), by suppressing shock and without impairing the acceleration response.

It is noted that the values of the characteristic curves in FIG. 5(a) vary to some extent in accordance with the result detected in step ST100 described above.

The process then proceeds to step ST102, where the transmission control device 31 determines a correction factor a0. A table having the characteristics as shown in FIG. 5(b) by way of example is prepared in advance, and the correction factor a0 is determined on the basis of the vehicle speed VEL and the throttle valve opening AP.

In FIG. 5(b), the horizontal axis represents the vehicle speed VEL (unit: km/h; range: 0 to 200, for example), and the vertical axis represents the correction factor a0 (unit: dimensionless; range: 1 to 2, for example).

This characteristic varies in accordance with the throttle valve opening AP.

Thus, a plurality of characteristic curves are prepared respectively for different throttle valve openings AP, and the transmission control device 31 selects one of the characteristic curves in accordance with the throttle valve opening at the present time point. The fourth torque TQ4 increases with increasing throttle valve opening AP, so that the correction factor a0 is increased. Accordingly, the characteristic curve rises as the throttle valve opening AP increases, while it falls as the throttle valve opening decreases.

While three types of throttle valve openings AP are shown in FIG. 5(b) by way of example, an arbitrary number of characteristic curves that enables appropriate determination of the correction factor a0 may be prepared.

As the vehicle speed VEL increases, the engine output torque decreases. Thus, correction is made to increase the output torque to thereby ensure smooth acceleration. Accordingly, the correction factor a0 has the characteristic that it increases with increasing vehicle speed VEL.

It is noted that the values of the characteristic curves in FIG. 5(b) vary to some extent in accordance with the result detected in step ST100 described above.

The process then proceeds to step ST103, where the transmission control device 31 determines a correction factor a1. A table having the characteristics as shown in FIG. 5(c) by way of example is prepared in advance, and the correction factor a1 is determined on the basis of a clutch slip ratio ESC.

In FIG. 5(c), the horizontal axis represents the clutch slip ratio ESC (unit: %; range: 0 to 200, for example), and the vertical axis represents the correction factor a1 (unit: dimensionless; range: 0 to 1, for example).

The clutch slip ratio ESC is obtained by dividing the rotational speed on the driven side of the starting clutch by the rotational speed on the driving side thereof. The clutch slip ratio of 0% indicates a released state of the starting clutch, the clutch slip ratio of 100% indicates a completely engaged state of the starting clutch, and the clutch slip ratio of 200% indicates a state where the driven side is rotating twice as fast as the driving side (this state occurs for example in the case where the starting clutch is released immediately before the vehicle shifts from the running state to the stopped state).

The correction factor a1 is set to 1 while the clutch slip ratio ESC is from e to f, in correspondence with the period in which the starting clutch is in an approximately engaged state. In the present embodiment, e and f are set to 90 and 110, respectively.

Furthermore, in a certain state of engagement of the clutch where the engine speed will increase unless the engine output torque is limited, i.e. during the periods in which the clutch slip ratio ESC is from 0 to e and from f to 200, the correction factor a1 is set to a value smaller than 1. In the present embodiment, the correction factor a1 is set to 0.5 when the clutch slip ratio ESC is 0, and the correction factor a1 is gradually increased as the clutch slip ratio ESC increases from 0 to approach e. Further, the correction factor a1 is set to 0.5 when the clutch slip ratio ESC is 200, and the correction factor a1 is gradually decreased as the clutch slip ratio ESC increases from f to approach 200.

In this manner, the correction factor a1 is set to stabilize the engine speed by limiting the engine output torque in accordance with the state of engagement of the starting clutch.

It is noted that the values of the characteristic curves in FIG. 5(c) vary to some extent in accordance with the result detected in step ST100 described above. The values of the correction factor a1 and e and f of the clutch slip ratio ESC are not restricted to those in the present embodiment; they may be set as appropriate.

The process then proceeds to step ST104, where the transmission control device 31 determines a correction factor a2. A table having the characteristics as shown in FIG. 5(d) by way of example is prepared in advance, and the correction factor a2 is determined on the basis of the second torque TQ2 and the first torque TQ1.

In FIG. 5(d), the horizontal axis represents a value obtained by subtracting the value of the first torque TQ1 from the value of the second torque TQ2 (unit: Nm; range: −100 to 200, for example), and the vertical axis represents the correction factor a2 (unit: dimensionless; range: 0 to 1, for example).

In the present embodiment, the correction factor a2 is set to 1 in the case where the value of the second torque TQ2 is not greater than the value of the first torque TQ1, i.e. during deceleration of the vehicle. In the case where the value of the second torque TQ2 exceeds the value of the first torque TQ1, the value of the correction factor a2 is decreased in proportion to the excess amount thereof. This correction can alleviate the shock that is generated from the vehicle during acceleration. While the horizontal axis starts at −100 in the illustrated example, the correction factor a2 is set to 1 even for the value of less than −100.

It is noted that the values of the characteristic curves in FIG. 5(d) vary to some extent in accordance with the result detected in step ST100 described above.

The process then proceeds to step ST105, where the transmission control device 31 calculates a variation ΔTQ3 using the following expression.

$$\Delta TQ3 = \Delta TQ1 \times a0 \times a1 \times a2$$

where ΔTQ1, a0, a1, and a2 are values determined in steps ST101, ST102, ST103, and ST104, respectively.

With this expression, the torque is corrected to appropriate torque in accordance with the vehicle speed VEL, the throttle valve opening AP, and the state of engagement of the starting clutch at the present time point. Furthermore, with the correction factor a2, the variation ΔTQ3 is corrected such that the greater the value of the detection-time torque TQ0 than the value of the first torque TQ1, the smaller the variation ΔTQ3. Accordingly, in the case where the value of the detection-time torque TQ0 is greater than the value of the first torque TQ1, the rise of the engine output torque is suppressed further than in the case where the value of the detection-time torque TQ0 is not greater than the value of the first torque TQ1.

The transmission control device 31 calculates the variation ΔTQ3 in the above-described manner, and the process shown in FIG. 4 is terminated.

It is noted that the processes in steps ST9 and ST11 to ST12 correspond to the third torque determining unit 31a3 of the present invention.

Figure 6:
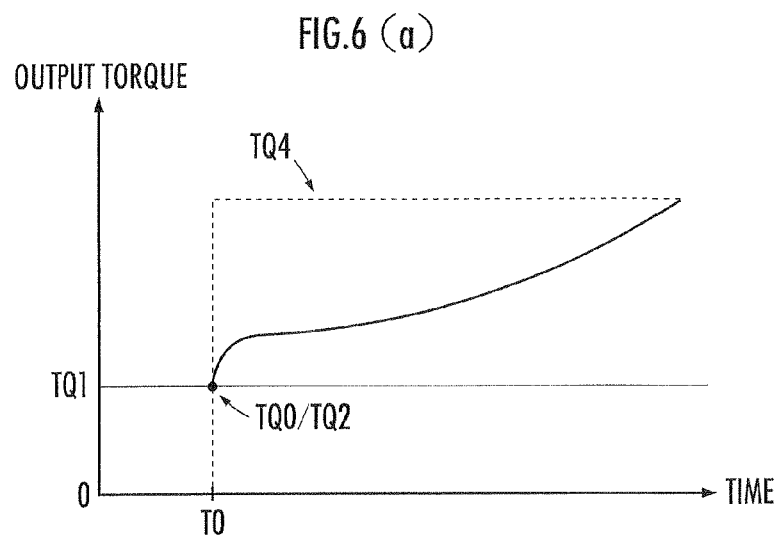
FIG. 6 shows, by way of example, (a) changes over time of the output torque in the case where the detection-time torque TQ0 is equal to the first torque TQ1, (b) changes over time of the output torque in the case where the detection-time torque TQ0 is smaller than the first torque TQ1, and (c) changes over time of the output torque in the case where the detection-time torque TQ0 is greater than the first torque TQ1 according to an embodiment of the present invention.
Figure 6:
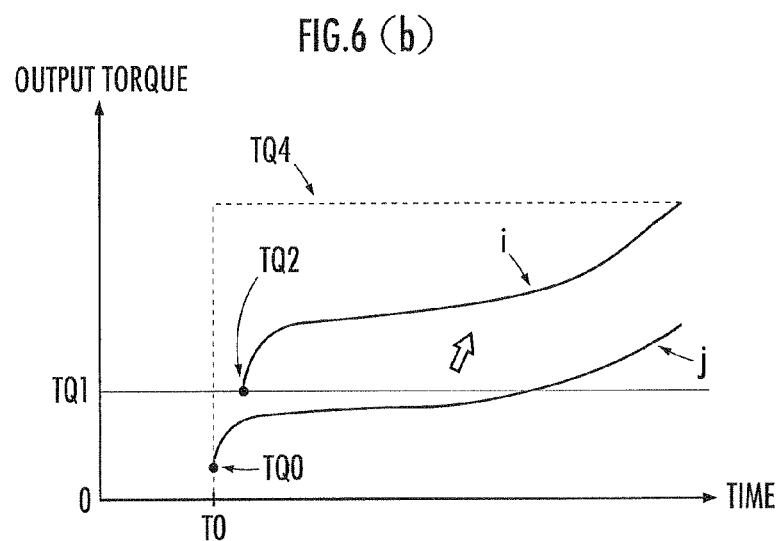
Figure 6:
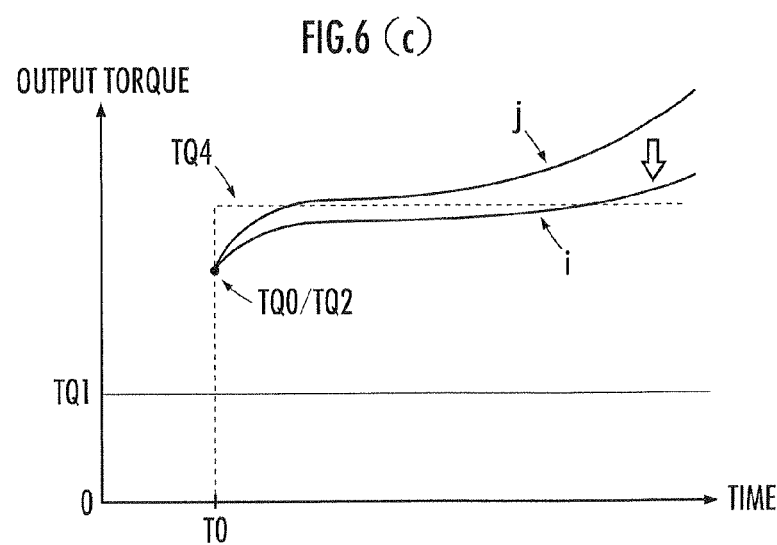

FIG. 6 shows, by way of example, changes over time (hereinafter, referred to as "patterns") of the engine output torque according to the control of the present invention. In FIGS. 6(a), (b), and (c), the horizontal axis represents time, and the vertical axis represents the engine output torque. Time T0 indicates the time when the present control processing has been started. The broken line shows the fourth torque TQ4 which is determined on the basis of the amount of depression of the accelerator pedal.

FIG. 6(a) shows patterns of the engine output torque in the case where the value of the detection-time torque TQ0 is equal to the value of the first torque TQ1, i.e. in the case where the vehicle is traveling at a constant speed. The output torque patterns of the present control processing are based on this pattern.

FIG. 6(b) shows a pattern of the engine output torque in the case where the value of the detection-time torque TQ0 is less than the value of the first torque TQ1, i.e. in the case where the vehicle is slowing down in response to depression of the brake pedal or the like. The pattern denoted by "i" is the pattern of the torque output from the engine according to the present control processing, while the pattern denoted by "j" is the pattern of the torque output from the engine in the absence of the present control processing.

Without the present control processing (pattern "j"), the torque output from the engine is insufficient for acceleration, and thus, a user would not feel the acceleration response until the time point when the pattern "j" reaches the first torque TQ1. With the present control processing (pattern "i"), the steps ST5 to ST7 in the flowchart in FIG. 2 are repeated to add the torque value until it becomes not less than the value of the first torque TQ1, whereby the value of the second torque TQ2 that is set as an initial value of the present control processing is raised. The start time of the second torque TQ2, however, is behind the start time of the control, due to an inevitable time delay caused by repetition of the steps ST5 to ST7.

FIG. 6(c) shows patterns of the engine output torque in the case where the value of the detection-time torque TQ0 is greater than the value of the first torque TQ1, i.e. in the case where the amount of depression of the accelerator pedal of the vehicle is relatively large. The pattern "i" is the pattern of the torque output from the engine according to the present control processing, while the pattern "j" is the pattern of the torque output from the engine in the absence of the present control processing.

The torque output from the engine in this case is greater than that in the case where the vehicle is traveling at a constant speed. Therefore, the rise of the torque output is suppressed by the correction factor a2 determined in accordance with the characteristic curves in. FIG. 5(d).

That is, generation of large torque is prevented before the engine mount attains the maximum elastic energy. Further, a sudden increase of the torque is suppressed immediately before the engine mount attains the maximum elastic energy. This can avoid shock due to the abrupt acceleration, thereby ensuring smooth acceleration.

As described above, in the present embodiment, the process in step ST2 ensures that the present control processing is started at the time when the vehicle speed VEL has exceeded the predetermined value V1, the throttle valve opening AP has exceeded the predetermined value V2, and the variation of the throttle valve opening AP has exceeded the predetermined value V3.

The value of the engine output torque at the start of the present control processing (i.e. the second torque TQ2) is set through the processes in steps ST4 to ST7 in the following manner. In the case where the value of the engine output torque when the present control processing was started (i.e. the detection-time torque TQ0) is less than the value of the first torque TQ1 that is determined in accordance with the vehicle speed VEL and the transmission gear ratio TR at the start of the present control processing, the value of the second torque is increased such that it is set to a value at least equal to the value of the first torque TQ1. In the case where the value of the detection-time torque TQ0 is not less than the value of the first torque TQ1, the value of the second torque is set to the detection-time torque TQ0.

Through the processes in steps ST11 and ST12, the engine output torque is determined in consideration of the time elapsed from the start of the control, the transmission gear ratio TR, the throttle valve opening AP, the vehicle speed VEL, and the clutch slip ratio ESC, and the third torque TQ3 is determined such that the greater the value of the detection-time torque TQ0 than the value of the first torque TQ1, the further the increase of the engine output torque is suppressed. Through the processes in steps ST13 and ST14, the engine output torque is set to the third torque TQ3 as long as the value of the third torque TQ3 is less than the value of the fourth torque TQ4.

Accordingly, smooth acceleration is realized irrespective of the magnitude of the engine output torque at the time when acceleration is requested.

Industrial Applicability

The present invention described above is advantageously applicable to a vehicle that determines the output torque of a drive source in accordance with an acceleration request or the like.

The invention claimed is:

1. An output torque control device for controlling output torque of a drive source of a vehicle, the device comprising:
   a timing detecting unit configured to detect a timing at which a value that varies in accordance with depression of an accelerator pedal of the vehicle has exceeded a predetermined value;
   a first torque determining unit configured to determine a value of the output torque of the drive source on the basis of a speed of the vehicle and a transmission gear ratio of a transmission that changes speed of an output of the drive source;
   a second torque determining unit configured to determine a value of the output torque of the drive source on the basis of both the value of the output torque of the drive source at the time when the timing detecting unit detected the timing (hereinafter, this torque is referred to as the "detection-time torque") and the value of the output torque of the drive source determined by the first torque determining unit (hereinafter, this torque is referred to as the "first torque");
   a third torque determining unit configured to determine a value of the output torque of the drive source on the basis of both the amount of depression of the accelerator pedal and the value of the output torque of the drive source determined by the second torque determining unit (hereinafter, this torque is referred to as the "second torque");
   a fourth torque determining unit configured to determine a value of the output torque of the drive source on the basis of the amount of depression of the accelerator pedal; and
   an output torque limiting unit configured to limit the output torque of the drive source to the value of the output torque of the drive source determined by the third torque determining unit (hereinafter, this torque is referred to as the "third torque"), from the time when the timing detecting unit detected the timing, as long as the value of the third torque is less than the value of the output torque of the drive source determined by the fourth torque determining unit (hereinafter, this torque is referred to as the "fourth torque");
   the second torque determining unit determining the value of the second torque to be at least the value of the first torque in the case where the value of the detection-time torque is less than the value of the first torque, and determining the value of the second torque to be the value of the detection-time torque in the case where the value of the detection-time torque is not less than the value of the first torque, and
   the third torque determining unit determining the value of the output torque of the drive source in such a manner that in the case where the value of the detection-time torque is greater than the value of the first torque, an increase of the value of the third torque is suppressed further than in the case where the value of the detection-time torque is not greater than the value of the first torque.

2. The output torque control device according to claim 1, wherein the timing detecting unit detects the timing at which a variation in the amount of depression of the accelerator pedal has exceeded a first predetermined value.

3. The output torque control device according to claim 1, wherein the timing detecting unit detects the timing at which a variation of the fourth torque has exceeded a second predetermined value.

4. The output torque control device according to claim 1, wherein the third torque determining unit determines the output torque further on the basis of the speed of the vehicle and the transmission gear ratio.

* * * * *